United States Patent
Kleibrink

(10) Patent No.: US 6,851,449 B2
(45) Date of Patent: Feb. 8, 2005

(54) SPRING-LOADED OIL OVERFLOW VALVE FOR DIAPHRAGM COMPRESSORS

(76) Inventor: Horst Kleibrink, Heisenbergstr. 16, 45473 Muelheim-Rhur (DE)

(*) Notice: Subject to any disclaimer, the term of this patent is extended or adjusted under 35 U.S.C. 154(b) by 69 days.

(21) Appl. No.: 10/431,209

(22) Filed: May 7, 2003

(65) Prior Publication Data

US 2003/0209273 A1 Nov. 13, 2003

(30) Foreign Application Priority Data

May 11, 2002 (DE) .......................................... 102 21 077

(51) Int. Cl.[7] .............................................. F16K 15/04
(52) U.S. Cl. ..................................... 137/539.5; 251/118
(58) Field of Search ....................... 137/539.5; 251/118; 417/383, 395; 60/592; 92/86

(56) References Cited

U.S. PATENT DOCUMENTS 2,969,084 A * 1/1961 Raymond ................... 137/471
6,574,960 B2 * 6/2003 Kleibrink ..................... 60/592

* cited by examiner

Primary Examiner—Ramesh Krishnamurthy
(74) Attorney, Agent, or Firm—McCormick, Paulding & Huber LLP

(57) ABSTRACT

A diaphragm head with a high energy content of the oil space (pressure×volume) has a strong negative influence on the corresponding behavior of the oil overflow valve. The reaction of the valve leads to an undesirable increase in the opening time by which more oil is discharged than oil introduced by means of a compensation pump. This has the result that after multiple strokes the diaphragm is not driven to its dead position. With this, all of the compressed gas is not expelled which is accompanied by a rapid decrease of the suction capacity.

The solution to this problem according to the present invention is achieved by means of a flow-interrupting edge formed at the junction of the valve seat and a restriction piece at the outlet side by which the operating forces of the valve spindle are sharply reduced. With this the effective closing force of the spring, as the dominant force component, leads to the desired fast closing time to the valve.

4 Claims, 4 Drawing Sheets

SPRING-LOADED OIL OVERFLOW VALVE FOR DIAPHRAGM COMPRESSORS

CROSS REFERENCE TO RELATED APPLICATION

Applicant hereby claims foreign priority under 35 U.S.C. §119 from German Application No. 102 21 077.2 filed 11 May 2002, the disclosure of which is herein incorporated by reference.

BACKGROUND OF THE INVENTION

The invention relates to a spring-loaded oil overflow valve for diaphragm compressors.

Diaphragm compressors operate similarly to normal piston compressors, but with a separating diaphragm between the gas side and the oil side. The oil side is formed by the usual piston-cylinder unit, whose working and dead volumes are filled with oil. On the gas side are gas suction and pressure valves. The volume displaced by the oscillating movement of the piston is transmitted to the diaphragm, which then on its gas side causes the intake, compression and exhaust of the gases. Since the oil pressure during the entire reciprocating movement corresponds to the course of the suction and compression pressure on the gas side, one can here also talk in terms of the operating mode of a piston compressor.

A small difference from piston compressors exists however in that in the case of diaphragm compressors a secondary oil circuit must be installed to allow compensation for the leakage of oil. For this purpose a compensation pump, driven by an eccentric on the crank shaft is used. This in synchronism with each piston stroke injects a small amount of oil into the oil space of the compressor.

This amount must theoretically be exactly as large as the leakage at the compressor piston. Since this cannot be technically realized, always an injected amount of oil is used which is larger than the leakage. This in turn has the result that with each stroke of the compressor piston somewhat too much oil is contained in the oil space, which then at the forward dead point of the diaphragm (that is, engaging the cover), leads to an uncontrollable increase in oil pressure. To prevent this, it is further necessary that an oil overflow valve be used, which limits the oil pressure at the forward dead point of the piston to a value which is slightly above the maximum pressure of the gas.

The spring-loaded oil overflow valve with a valve seat and a sealing ball in the seat works as a safety valve and only allows the discharge of a quantity of oil that is actually too much for that delivered from the compensation pump to the oil space. This quantity, which is discharged with each stroke, is on the one hand dependent upon the opening characteristics of the oil overflow valve, that is, the configuration of the seat member and the elements responsible for the spring characteristic, and, on the other hand, the energy content of the oil space (pressure×volume) which has a strong influence on the corresponding behavior of the oil overflow valve. The latter leads to undesirable increases in the opening time of the oil overflow valve such that more oil is discharged than introduced by the compensation pump. This has the result that after many pumping strokes the diaphragm is no longer driven to its forward dead point. Consequently, not all of the compressed gas is discharged which is accompanied by a rapid decrease in the suction power.

In DE 10,056,568 the restriction apparatus arranged in the supply line for the oil overflow valve leads to a faster closing time by means of the associated pressure drop before the oil overflow valve; however, with this an additional valve control is necessary.

SUMMARY OF THE INVENTION

The object of the present invention is to provide a spring-loaded overflow valve without the requirement of an additional valve control whereby the excessively long open times of the oil overflow valve with the various operating conditions of the oil space are avoided.

The object is achieved by means of a flow interrupting edge formed at the junction of the seat and a restriction piece coupled to the overflow valve outlet. The edge sharply reduces the output force of the valve spindle, and with that the effective downward spring force, as the dominant force component, leads to the desired faster closing times of the valve.

BRIEF DESCRIPTION OF THE DRAWINGS

A preferred embodiment of the invention is illustrated in the drawings and as described further below.

DESCRIPTION OF THE PREFERRED EMBODIMENTS

Figure 1:
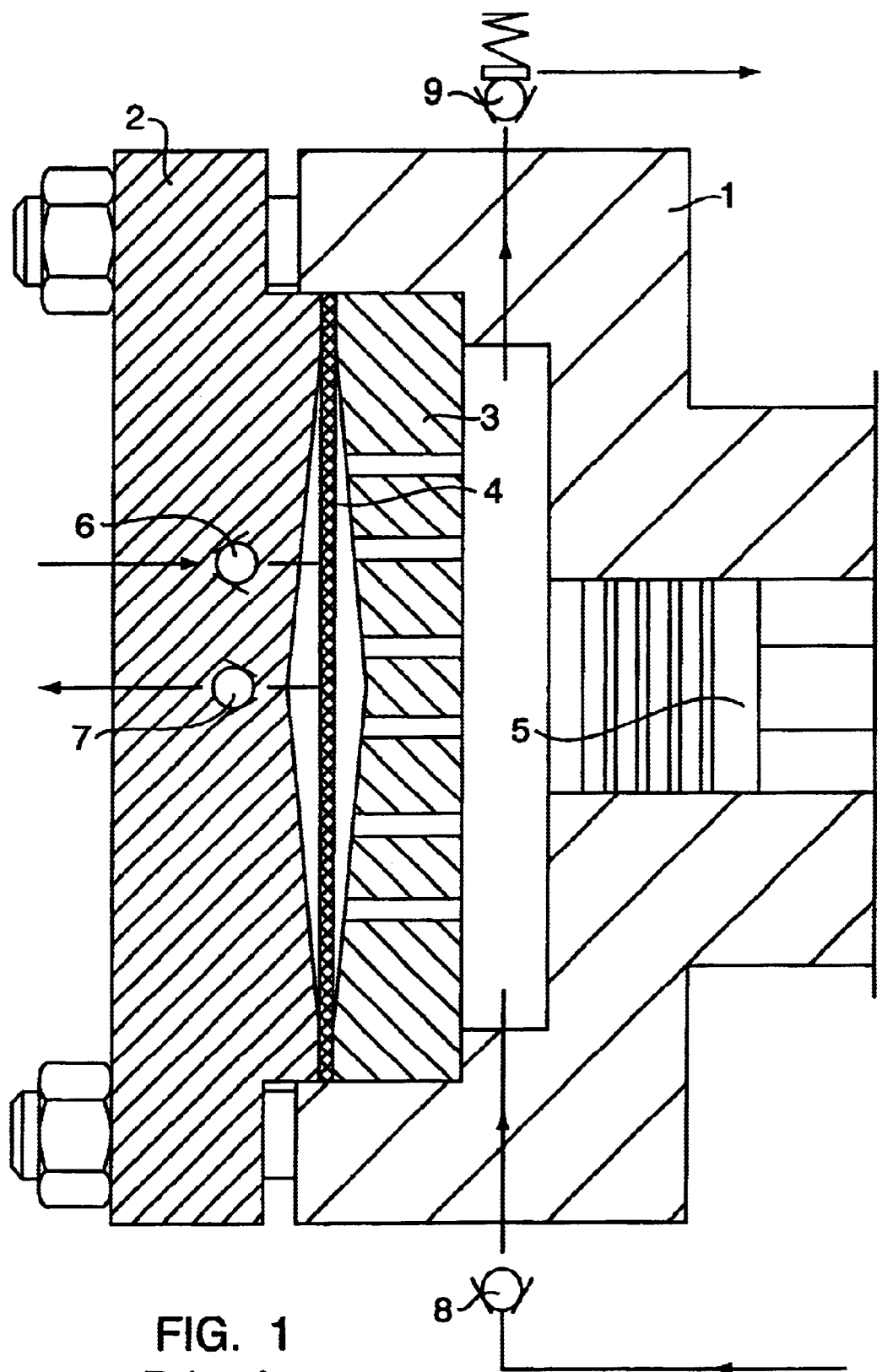
FIG. 1 shows a complete diaphragm pump head in an embodiment according to the prior art.

The principal components of a diaphragm compressor according to FIG. 1 include a flange with a cylinder (1), a cover (2), an aperture plate (3), a diaphragm (4), a piston (5), a suction valve (6), a pressure valve (7), a check valve (8), and an overflow valve (9). The volume designated as the oil space extends between the piston (5) and the diaphragm (4). The volume designated as the gas space extends from the diaphragm (4) to the cover (2). The diaphragm displacement volume is matched with the piston displacement volume (surface area×stroke), so that the effectiveness of a piston compressor exists. The diaphragm operates in volume synchronization with the piston, drawing in the gas through the suction valve 6, compressing the gas and expelling the gas through the pressure valve 7.

The leakage of oil at the piston (5) must be compensated for by an external pump. For this, a small piston pump driven by an eccentric is used, which pump with each stroke injects a small amount of oil into the oil space through the check valve (8). Therefore, since the eccentric sits directly on the crank shaft there occurs in synchronism with each stroke of the main piston (5) an accurately dosed injection by the compensation pump. Since this injected amount of oil for the purpose of operational reliability must be larger than the leakage at the piston (5), an overflow valve (9) is also required, which allows the excessive amount of injected oil to flow out at the forward dead point of the piston (5) and diaphragm (4).

The quantity of oil discharged by means of the oil overflow valve must not therefore be larger than the excess portion in the oil space. Even with oil spaces with high energy content, that is, with a high product of (pressure×oil volume), there is usually an excessively long opening time of the overflow valve which then discharges an excessively high quantity of oil.

Figure 2:
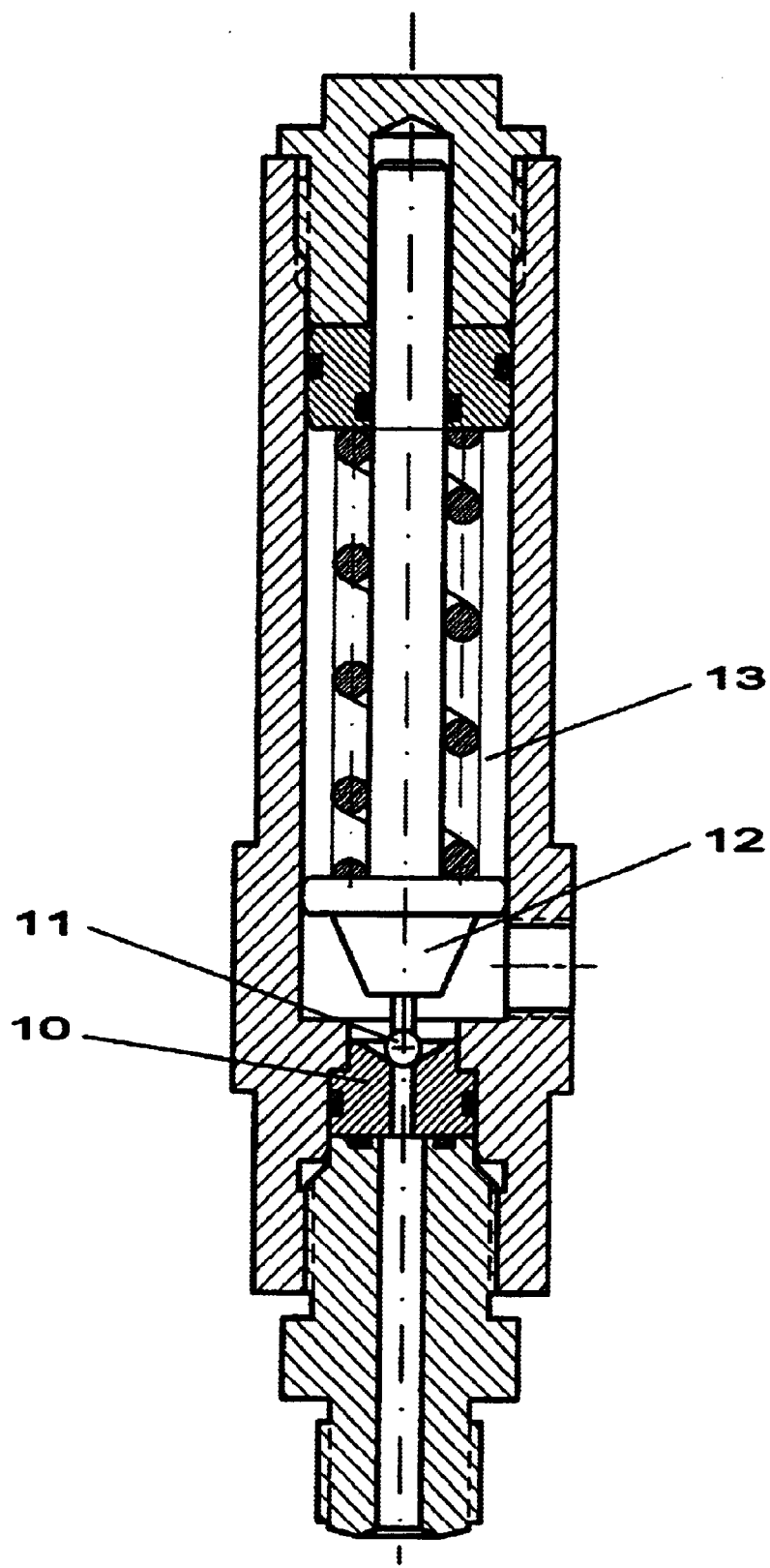
FIG. 2 shows an oil overflow valve according to the prior art.

The oil overflow valve illustrated in FIG. 2 according to the prior art consists essentially of a seat 10 with a spherical sealing surface and a ball 11 embedded therein as a sealing element. This ball is then pressed against the seat 10 by means of a spring-loaded spindle 12. In this regard the spindle 12 is guided within the bore of the housing of the spring space 13. In the opening process the full flow against the ball 11 can with diaphragm heads of high energy content receive an excessively high upward force which allows the displacement and overflow quantity to be too large.

Figure 3:
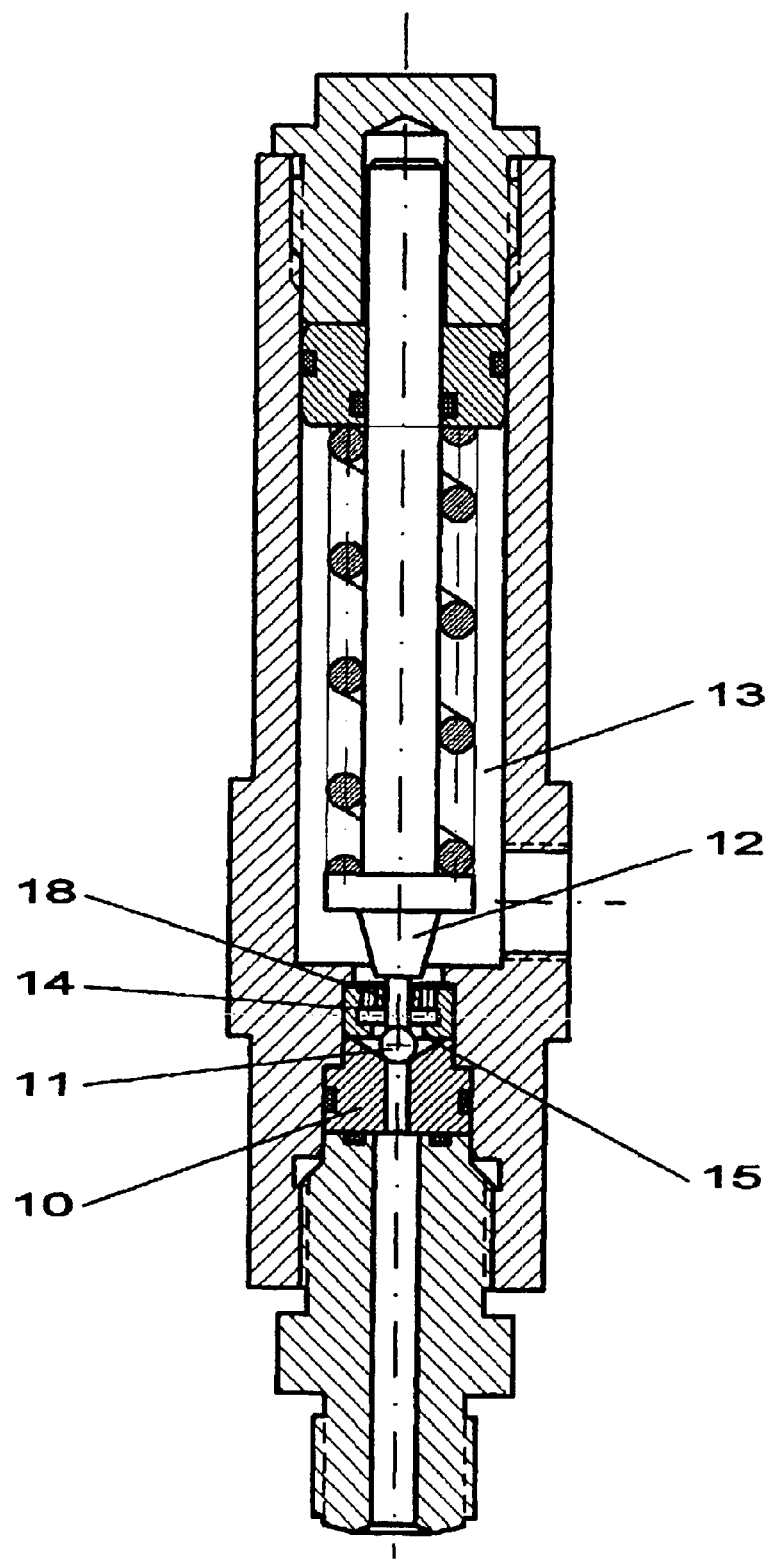
FIG. 3 shows an oil overflow valve with the features according to the present invention.
Figure 4:
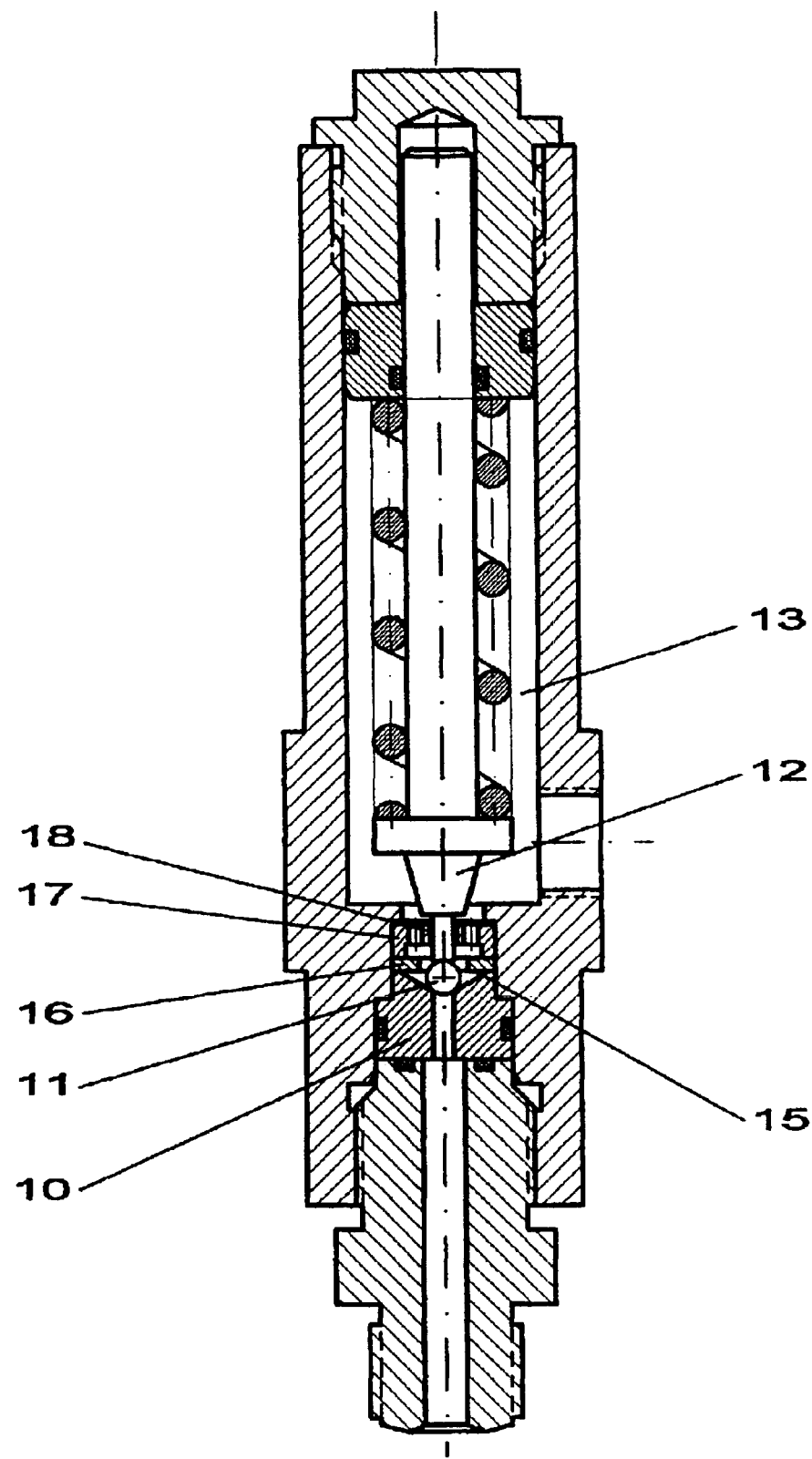
FIG. 4 shows a two-part version of the restriction piece.

The oil overflow valve illustrated in FIGS. 3 and 4 according to the present invention consists of a flow-interrupting edge 15 at the junction of the seat 10 and the supplemental restriction piece 14 connected to the output side. The edge 15 sharply reduces the upward driving force of the spindle 12. With this the effective downward spring force, as the dominant force component, leads to the desired fast closing time of the valve.

In FIG. 4 the two-part restriction piece 14 is seen as a disk 16 or orifice plate and splitter body 17. In both versions of FIGS. 3 and 4 the guiding structure for the spindle 12 by means of the central bore 18 of the restriction piece 14, or correspondingly the splitter body 17, is the same.

It is claimed:

1. A spring-loaded oil overflow valve for a diaphragm compressor with a valve seat and a sealing ball therein, the ball being loaded by means of a spindle under spring tension characterized by a flow-interrupting edge (15) formed at a junction of the seat (10) and a restriction piece (14) connected to the outlet, which sharply reduces the driving force of the spindle, and with this, the effective force of the spindle, as the dominant force component, leads to a desirable fast closing time of the valve.

2. A spring-loaded oil overflow valve for diaphragm compressors according to claim 1 characterized in that the restriction piece (14) is in two parts formed by a restriction disk (16) and splitter body (17).

3. A spring-loaded oil overflow valve for diaphragm compressors according to claim 1 characterized by a central bore (18) disposed in the restriction piece (14), which serves as a guide for the spring-loaded spindle (12).

4. A spring-loaded oil overflow valve for diaphragm compressors according to claim 2 characterized by a central bore (18) disposed in the splitter body (17), which serves as a guide for the spring-loaded spindle (12).

* * * * *